United States Patent [19]
Moisin

[11] Patent Number: 5,052,039
[45] Date of Patent: Sep. 24, 1991

[54] LINE INTERFACE CIRCUIT

[75] Inventor: Mihail S. Moisin, Lake Forest, Ill.

[73] Assignee: Northern Telecom Limited, Montreal, Canada

[21] Appl. No.: 464,140

[22] Filed: Jan. 16, 1990

[51] Int. Cl.$^5$ ............................................. H04M 1/00
[52] U.S. Cl. .................................... 379/402; 379/345; 379/399
[58] Field of Search ............... 379/387, 399, 345, 402, 379/403, 404, 413

[56] References Cited

U.S. PATENT DOCUMENTS

| | | | |
|---|---|---|---|
| 4,087,647 | 5/1978 | Embree et al. | 379/413 |
| 4,103,112 | 7/1978 | Korsky . | |
| 4,368,361 | 1/1983 | Chung et al. | 379/404 |
| 4,429,186 | 1/1984 | Gartner | 379/413 |
| 4,484,032 | 11/1984 | Rosenbaum . | |
| 4,514,595 | 4/1985 | Rosenbaum et al. . | |
| 4,682,355 | 7/1987 | Bailly et al. | 379/413 |
| 4,737,988 | 4/1988 | Tsunoda | 379/413 |
| 4,764,956 | 8/1988 | Rosch et al. | 379/413 |
| 4,829,567 | 5/1989 | Moisin | 379/413 |
| 4,922,531 | 5/1990 | Moisin | 379/413 |

Primary Examiner—Jin F. Ng
Assistant Examiner—Jhancy Augustus
Attorney, Agent, or Firm—Foley and Lardner

[57] ABSTRACT

Alternating current signals are differentially coupled between a two wire communications line and a telecommunications facility by a line interface circuit. The line interface circuit differentially drives signals destined for the two wire communications line, with a predetermined source impedance, via tip and ring amplifiers and tip and ring feed resistors. An amplifier circuit differentially receives signal voltages being developed by currents traversing the tip and ring feed resistors, and detects signals destined for the telecommunications facility by subtracting a representation of the signals destined for the two wire communications from a representation of the differentially received signals. A notch filter connected in series with the tip and ring feed resistors impedes any longitudinal signals of about a predetermined frequency which would otherwise traverse the tip and ring feed resistors, whereby a routinely available industry standard common mode rejection performance characteristic of a differential input of the amplifier circuit consistently yields telephony standard performance in the presence of reactively coupled longitudinal power line signals of about said predetermined frequency.

8 Claims, 1 Drawing Sheet

LINE INTERFACE CIRCUIT

FIELD OF THE INVENTION

The invention relates to telecommunications and more particularly relates to a line interface circuit for supplying energizing current for operating a telephone station set and for coupling signals between a telephone facility and the telephone set via a two wire communication line.

BACKGROUND OF THE INVENTION

Over the past decade in many countries, operating telephone companies have been investing extensively in a new generation of telephone switching equipment, generally referred to as digital switching systems. Such systems are characterized by an abundance of silicon based integrated circuits which act in concert to provide time division multiplex channels for coupling telephone sets in communication as required. Such systems are attractive because they require less space, less maintenance and attract greater revenue as compared to previous systems which provided for communications via metallic paths. Substantial design efforts have been committed to developing appropriate line interface circuits in the same technology. Recently transformerless analog silicon based integrated line interface circuits which are capable of performing coupling requirements between a switching system and a telephone set have become available. However many of the transformerless line circuit designs require a degree of precision and perfection in manufacturing, which typical state of the art integrated circuit manufacturers find difficult and expensive to meet. For example in U.S. Pat. No. 4,514,595, an "Active Impedance Line Feed Circuit", S.D. Rosenbaum et al disclose tip and ring amplifiers which are intended to feed tip and ring leads of a telephone line with the preferred direct current feed resistance of 400 ohms and the preferred AC impedance of 900 ohms. A control circuit drives the amplifiers in differential response to signals derived across matched tip and ring feed resistors which are coupled in series with outputs of the tip and ring amplifiers. The derived signals are coupled to a differential input of the control circuit via precision tip and ring voltage dividers. It is recommended that 0.05% tolerance feed resistors and 0.1% tolerance voltage divider resistors are preferred for interfacing telephone lines with a central switching office. Furthermore it is recommended that the differential input have the best possible common mode rejection characteristic so that longitudinally induced signals on the telephone line can be tolerated. Consequently the spectacular price and performance advantages realized in silicon based central office switching networks were not achieved to similar degree by this design of a line feed circuit.

In many switching systems, an individual line circuit is required to interface to each and every telephone line that is connected to the switching system. Hence, the cost of the line interface requirement has continued to be a major portion of the hardware cost of such switching systems. Furthermore in association with many telephone lines, the price/operating performance of many typical transformerless line interface circuits is often inferior to that of older designs as exemplified in U.S. Pat. No. 4,103,112 issued to V.V. Korsky on July 25, 1978. This is often due to the conditions in which a particular telephone line is required to operate. For example excessive longitudinal energy may be reactively coupled to the telephone line from nearby power utility distribution lines. Longitudinally induced currents on longer telephone lines may exceed the direct energizing current while the telephone set is in the OFF HOOK condition. This results in periodic reversals in the flow of the energizing current. In his U.S. Pat. No. 4,484,032, "Active Impedance Transformer Assisted Line Feed Circuit", S.D. Rosenbaum recognized some of the difficulties associated with his transformerless design and reintroduces a transformer. In this later development, his original design is modified in that feed resistor and voltage divider resistor recommended tolerances are loosened to 1% by using only the direct current component of the signals derived across the tip and ring feed resistors while differential AC signals are transformer coupled to the differential amplifier, substantially to the exclusion of longitudinal AC signals. However the tip and ring amplifiers are yet required to tolerate longitudinal currents on the telephone line. As the feed resistor may also be exposed to severe electrical stress, as can be the result of a random transient event such as a lightening strike or a power line cross, the values of the feed resistors may become altered beyond tolerance limits for acceptable line circuit operation.

It is an object of the invention to provide a line interface circuit wherein common mode signals are substantially impeded such that required common mode rejection characteristics of active components in the circuit are less critical.

SUMMARY OF THE INVENTION

In a line interface circuit, tip and ring feed amplifiers are sufficiently isolated from longitudinal signals, as may be reactively impressed upon a telephone line, that unidirectionally conductive amplifying devices are sufficient to provide for the tip and ring feed amplifier functions.

In accordance with the invention alternating current signals are differentially coupled between a two wire communications line and a telecommunications facility by differentially driving signals destined for the two wire communications line, with a predetermined source impedance, via tip and ring amplifiers and tip and ring feed resistors; differentially receiving, by means of a differential amplifier, signal voltages being developed by currents traversing the tip and ring feed resistors; detecting signals destined for the telecommunications facility by subtracting a representation of the signals destined for the two wire communications from a representation of the differentially received signals; and notch filtering, in series with the tip and ring feed resistors, to impede any longitudinal signals of about a predetermined frequency which would otherwise traverse the tip and ring feed resistors, whereby a routinely available industry standard common mode rejection performance characteristic of said differential amplifier consistently yields telephony standard performance in the presence of reactively coupled longitudinal power line frequency signals.

A line interface circuit in accordance with the invention provides for coupling differential alternating current signals between a telephone facility and tip and ring leads of a two wire communications line, to the substantial exclusion of longitudinal signals of about a predetermined frequency. The line interface circuit includes tip and ring amplifiers each having an output, and an input for receiving alternating current signals destined for the communications line and tip and ring terminals for connection to the tip and ring leads respectively. A transformer includes a secondary winding having an inductance, and tip and ring windings being similar with respect to each other. The tip winding is connected in series between the tip terminal and the output of the tip amplifier, and the ring winding is connected in series between the ring terminal and the output of the ring amplifier. The tip and ring windings are arranged in flux reinforcing configuration with respect to any longitudinal signal current at the tip and ring terminals. A reactive element is connected across the secondary winding for providing a series resonant circuit having a resonant frequency of about said predetermined frequency, whereby longitudinal signals of about said resonant frequency are impeded.

In one example in accordance with the invention the line interface circuit comprises:

tip and ring amplifiers each having an output, an input for receiving alternating current signals destined for the communications line, a transistor having an emitter electrode, a base electrode, and a collector electrode, the collector electrode corresponding to said amplifier output, a first resistor being connected between a respective one of the power terminals and the emitter electrode, a second resistor being connected between a respective one of the power terminals and the base electrode, an AC coupling network being connected between the input terminal and the base electrode, a DC feedback path being connected between the output terminal and the base electrode, and an AC feedback path being connected between the output terminal and the base electrode;

tip and ring terminals for connection to the tip and ring leads respectively;

a transformer including a secondary winding, having an inductance, and tip and ring windings being similar with respect to each other, the tip winding being connected in series between the tip terminal and the output of the tip amplifier, and the ring winding being connected in series between the ring terminal and the output of the ring amplifier, the tip and ring windings being arranged in flux reinforcing configuration with respect to any longitudinal signal current at the tip and ring terminals;

a reactive element being connected across the secondary winding for providing a series resonant circuit having a resonant frequency of about said predetermined frequency, whereby longitudinal signals of about said resonant frequency are impeded;

a resistance network including tip and ring feed resistors and tip and ring voltage taps being defined by tip and ring voltage dividers connected across the tip and ring feed resistors, the tip feed resistor being connected between the tip terminal and the output of the tip amplifier, in series with the tip winding, and the ring feed resistor being connected between the ring terminal and the output of the ring amplifier, in series with the ring winding; and an amplifier circuit having a transmit output and being responsive to differential signals across the tip and ring voltage taps and to AC signals at one of the inputs of the tip and ring amplifiers for providing AC signals from the communications line and destined for the telephone facility at the transmit output.

BRIEF DESCRIPTION OF THE DRAWINGS

An example embodiment is discussed with reference to the accompanying drawings in which.

DESCRIPTION OF THE EXAMPLE EMBODIMENT

Figures 1, 2:
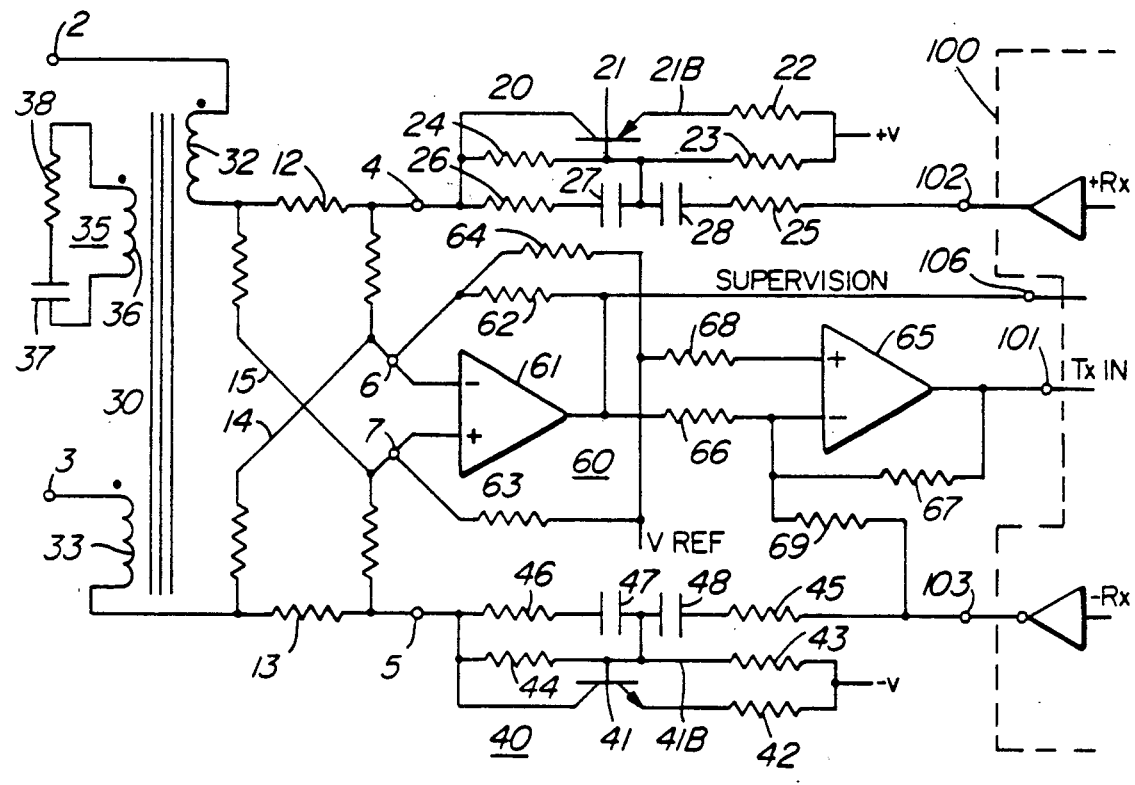
FIG. 1 is a schematic diagram of a line interface circuit in accordance with the invention.
FIG. 2 is a graphical representation of a functional characteristic of a filter used in the line interface circuit illustrated in FIG. 1. The graph includes a horizontal axis graduated in kilohertz and a vertical axis graduated in decibels.

A typical telephone line interface circuit is intended for use for coupling alternating current (AC) signals between a two wire telecommunications line, frequently referred to as a subscriber loop, and a telephone switching facility, typically a central office, or a remote line module or concentrator associated with the central office. The line interface circuit is also intended to supply the two wire telecommunications line with energizing direct coupled (DC) current, such that a telephone set or the like being connected to the line will be supplied with at least about twenty milliamperes of DC current while it is in an OFF HOOK state.

The line interface circuit in FIG. 1 includes a tip terminal 2 and a ring terminal 3, for connection to tip and ring leads of a subscriber loop, not shown. An input terminal 102 of a tip amplifier 20, and an input terminal 103 of a ring amplifier 40, are connected to receive AC signals which are destined for the subscriber loop, from an access circuit 100, which is associated with a telephone switching facility, not shown. AC signals from the subscriber loop and destined for the telephone switching facility are coupled to the access circuit 100 via a terminal 101. Supervision signal which indicate ON HOOK, OFF HOOK and DIAL information to the access circuit 100 are communicated thereto via a terminal 106. Power terminals, labeled +V and −V, are for connection across corresponding terminals of a central office battery supply, not shown, usually a −48 volt supply. In this example a reference voltage of about −24 volts, convenient for the operation of an amplifier circuit 60, is supplied via a voltage reference lead V Ref.

In the line interface circuit, the tip amplifier 20 includes a PNP transistor 21 being connected via collector, emitter and base electrodes in combination with resistors 22–26 and capacitors 27 and 28 between the power terminal +V, the terminal 4, and the input terminal 102, as shown. The ring amplifier 40 includes an NPN transistor 41 being connected via collector, emitter and base electrodes in combination with resistors 42–46 and capacitors 47 and 48, between the power terminal −V, the terminal 5, and the input terminal 103, as shown.

A resistor network 10 includes a tip feed resistor 12 connected in series with the collector electrode of the PNP transistor 21 via the terminal 4, and a ring feed resistor 13 connected in series with the collector electrode NPN transistor 41 via terminal 5. The resistor network 10 also includes tip and ring voltage dividers 14 and 15 connected as shown to provide tip and ring voltage taps 6 and 7.

A transformer 30 includes a tip winding 32 connected in series between the tip feed resistor 12 and the tip terminal 2, and a ring winding 33 connected in series between the ring feed resistor 13 and the ring terminal 3. The tip winding 32 and the ring winding 33 are poled in such a way that differential mode currents are of a flux cancelling effect, while common mode currents, as may result from electrical energy being induced longitudinally along the subscriber loop, are of a flux adding effect in the transformer 30. The transformer 30 also includes a secondary winding 35 across which a capacitor 37 is connected in series with a resistor 38 to provide a notch filter 35. The value of the capacitor 37 is preferably chosen so that in combination with inductance of the secondary winding 36, the notch filter 35 exhibits a characteristic generally as exemplified in FIG. 2, for significantly impeding traversal of the tip winding 32 and the ring winding 33 by common mode currents at utility power line frequencies. Component values and parameters in relation to the transformer 30 and the notch filter 35 are as follows:

windings 32, 33—700 turns (0.54H) each
winding 36—2500 turns (6.9H)
capacitor 37—1 microfarad
resistor 38—1 kilohm The amplifier circuit 60 includes a first amplifier 61 having a differential input and an output and being connected in combination with resistors 62-64, the tip voltage tap 6, the ring voltage tap 7, and the voltage reference lead V Ref. A second amplifier 65 has a differential input and an output connected in combination with resistors 66-69, and the terminal 101.

In operation, the energizing DC current flow is via the PNP transistor 21 and the NPN transistor 41 which are operated to each have a collector electrode source resistance of about 100 ohms. The source resistance is determined by chosen values of the resistors 22-24 and 42-44 respectively. The tip feed resistor 12 and the ring feed resistor 13 are also chosen preferable to each be within 5% of 100 ohms whereby the overall source resistance is about 400 ohms, in this example. The AC source impedances at the collector electrodes of the PNP transistor 21 and the NPN transistor 41 are primarily determined by the chosen of values the components 25-28 in relation to the resistor 22, and by the chosen values, the components 45-48 in relation to the resistor 42, respectively. Component values and parameters in relation to the tip amplifier 20 and the ring amplifier 40 are as follows to provide a source impedance substantially equivalent to 900 ohms in series with 2.16 microfarads across the tip terminal 2 and the ring terminal 3:

resistor 22—22 ohms
resistor 23—33 kilohms
resistor 24—100 kilohms
resistor 25—10 kilohms
resistor 26—9.1 kilohms
capacitor 27—0.1 microfarad
capacitor 28—0.1 microfarad
resistor 42—20 ohms
resistor 43—33 kilohms
resistor 44—100 kilohms
resistor 45—10 kilohms
resistor 46—9.1 kilohms
capacitor 47—0.1 microfarads
capacitor 48—0.1 microfarads The tip amplifier 20 and the ring amplifier 40 respond to AC signals applied at the input terminal 102 and the input terminal 103 to differentially drive the subscriber loop via the tip terminal 2 and the ring terminal 3.

When the telephone instrument associated with the subscriber loop is in an OFF HOOK condition, differential currents traversing the tip feed resistor 12 and the ring feed resistor 13 are the result of AC signals from the tip amplifier 20 and the ring amplifier 40, in addition to modulation of the energizing direct current effected by the telephone instrument. These currents develop corresponding voltage signals across the tip feed resistor 12 and the ring feed resistor 13 which are coupled to the amplifier circuit 60 via the tip voltage tap 6 and the ring voltage tap 7. The first amplifier 61 amplifies these voltage signals and provides corresponding signals for use in a supervision detection function performed by way of the access circuit 100, and for use by the second amplifier 65 for detection and transmission of AC signals destined for the telephone switching facility via the terminal 106.

As previously mentioned, tolerances for ohmic values of the tip and ring feed resistors and the resistors in the tip and ring voltage dividers are substantially relaxed to about 5%, as compared with tolerances which were preferably restricted to 1% or less, for similar circuit elements in previous line interface circuits. Of course this relaxation of ohmic tolerances brings with it a small but significant reduction in manufacturing cost and an increased probability of long term acceptable circuit functionality. These advantages accrue from the arrangement of the transformer coupled notch filter in series with the resistor network 10. Similarly, the common mode rejection characteristic of the differential input of the amplifier circuit 60 is likewise relaxed. Hence it is envisaged that further economic advantage may be derived by integrating the amplifier circuit 60 into a substrate common to the access circuit 100. In such an arrangement the terminals 101 and 106 migrate to the interior of the access circuit 100, becoming effectively nonexistent, and the voltage taps 6 and 7 are connected at corresponding new terminals of the access circuit 100. The resistor network 10 and the tip and ring amplifiers 20 and 40 would most likely remain as being provided by discrete components as these may from time to time be exposed to extraordinary electrical stresses that would likely be damaging to the typical silicon integrated circuit.

What is claimed is:

1. A line interface circuit for coupling differential alternating current signals between a telephone facility and tip and ring leads of a two wire communications line, to the substantial exclusion of longitudinal signals of about a predetermined frequency, the line interface circuit comprising:

tip and ring amplifiers each having an output, and an input for receiving alternating current signals destined for the communications line;

tip and ring terminals for connection to the tip and ring leads respectively;

a transformer including a secondary winding, having an inductance, and tip and ring windings being similar with respect to each other, the tip winding being connected in series between the tip terminal and the output of the tip amplifier, and the ring winding being connected in series between the ring terminal and the output of the ring amplifier, the tip and ring windings being arranged in flux reinforcing configuration with respect to any longitudinal signal current at the tip and ring terminals;

a capacitive component and a resistive component being connected in series across the secondary winding for providing a series resonant circuit having a resonant frequency of about said predetermined frequency, whereby longitudinal signals of about said resonant frequency are impeded, and an ohmic value of the resistive component being of a value whereby longitudinal signals of up to about a second harmonic of said resonant frequency are impeded, albeit to a lesser degree than the first mentioned longitudinal signals.

2. A line interface circuit for coupling differential alternating current signals between a telephone facility and tip and ring leads of a two wire communications line, to the substantial exclusion of longitudinal signals of about a predetermined frequency, the line interface circuit comprising:

tip and ring amplifiers each having an output, and an input for receiving alternating current signals destined for the communications line;

tip and ring terminals for connection to the tip and ring leads respectively;

a transformer including a secondary winding, having an inductance, and tip and ring windings being similar with respect to each other, the tip winding being connected in series between the tip terminal and the output of the tip amplifier, and the ring winding being connected in series between the ring terminal and the output of the ring amplifier, the tip and ring windings being arranged in flux reinforcing configuration with respect to any longitudinal signal current at the tip and ring terminals;

a capacitive component and a resistive component being connected in series across the secondary winding for providing a series resonant circuit having a resonant frequency of about said predetermined frequency, whereby longitudinal signals of about said resonant frequency are impeded and an ohmic value of the resistive component being of a value whereby longitudinal signals of up to about a third harmonic of said resonant frequency are impeded, albeit to degrees lesser than the first mentioned longitudinal signals.

3. A line interface circuit for supplying energizing direct current via tip and ring leads of a two wire communications line, to the exclusion of periodic current reversals as may otherwise be symptomatic of longitudinal signals being reactively coupled to the two wire communications line, the line interface circuit comprising:

first and second power terminals for connection to a power source;

tip and ring terminals for connection to the tip and ring leads respectively;

tip and ring amplifiers each having an output, and an input for receiving alternating current signals destined for the two wire communications line;

a transformer including a secondary winding, having an inductance, and tip and ring windings being similar with respect to each other, the tip winding being connected in series between the tip terminal and the output of the tip amplifier, and the ring winding being connected in series between the ring terminal and the output of the ring amplifier, the tip and ring windings being arranged in flux reinforcing configuration with respect to any longitudinal signal current at the tip and ring terminals;

a reactive element being connected across the secondary winding for providing a series resonant circuit having a resonant frequency as would be defined by the period of said current reversals; and the tip and ring amplifiers each comprising:

a transistor having an emitter electrode, a base electrode, and a collector electrode, corresponding to said amplifier output, a first resistor being connected between a respective one of the power terminals and the emitter electrode, a second resistor being connected between a respective one of the power terminals and the base electrode, an AC coupling network being connected between the input terminal and the base electrode, a DC feedback path being connected between the output terminal and the base electrode, and an AC feedback path being connected between the output terminal and the base electrode.

4. A line interface circuit as defined in claim 3 wherein said reactive element comprises a capacitive component and a resistive component being connected in series across the secondary winding, an ohmic value of the resistive component being of a value whereby longitudinal signals of up to about a second harmonic of said resonant frequency are impeded, albeit to a lesser degree than the first mentioned longitudinal signals.

5. A line interface circuit as defined in claim 3 wherein said reactive element comprises a capacitive component and a resistive component being connected in series across the secondary winding, an ohmic value of the resistive component being of a value whereby longitudinal signals of up to about a third harmonic of said resonant frequency are impeded, albeit to degrees lesser than the first mentioned longitudinal signals.

6. A line interface circuit for coupling differential alternating current signals between a telephone facility and tip and ring leads of a two wire communications line, to the substantial exclusion of longitudinal signals of about a predetermined frequency, the line interface circuit comprising:

tip and ring amplifiers each having an output, and an input for receiving alternating current signals destined for the communications line;

tip and ring terminals for connection to the tip and ring leads respectively;

a transformer including a secondary winding, having an inductance, and tip and ring windings being similar with respect to each other, the tip winding being connected in series between the tip terminal and the output of the tip amplifier, and the ring winding being connected in series between the ring terminal and the output of the ring amplifier, the tip and ring windings being arranged in flux reinforcing configuration with respect to any longitudinal signal current at the tip and ring terminals;

a capacitive component and a resistive component being connected in series across the secondary winding for providing a series resonant circuit having a resonant frequency of about said predetermined frequency, whereby longitudinal signals of about said resonant frequency are impeded and an ohmic value of the resistive component being of a value whereby longitudinal signals of up to about a third harmonic of said resonant frequency are impeded, albeit to degrees lesser than the first mentioned longitudinal signals.

a resistance network including tip and ring feed resistors and tip and ring voltage taps being defined by tip and ring voltage dividers connected across the tip and ring feed resistors, the tip fed resistor being connected between the tip terminal and the output of the tip amplifier, in series with the tip winding, and the ring feed resistor being connected between the ring terminal and the output of the ring amplifier, in series with the ring winding; and an amplifier circuit having a transmit output and being responsive to differential signals across the tip and ring voltage taps and to AC signals at one of the inputs of the tip and ring amplifiers for providing AC signals from the communications line and destined for the telephone facility at the transmit output.

7. A line interface circuit for coupling differential alternating current signals between a telephone facility and tip and ring leads of a two wire communications line, to the substantial exclusion of longitudinal signals of about a predetermined frequency, the line interface circuit comprising:

tip and ring amplifiers each having an output, and an input for receiving alternating current signals destined for the communications line;

tip and ring terminals for connection to the tip and ring leads respectively;

a transformer including a secondary winding, having an inductance, and tip and ring windings being similar with respect to each other, the tip winding being connected in series between the tip terminal and the output of the tip amplifier, and the ring winding being connected in series between the ring terminal and the output of the ring amplifier, the tip and ring windings being arranged in flux reinforcing configuration with respect to any longitudinal signal current at the tip and ring terminals;

a capacitive component and a resistive component being connected in series across the secondary winding for providing a series resonant circuit having a resonant frequency of about said predetermined frequency, whereby longitudinal signals of about said resonant frequency are impeded and an ohmic value of the resistive component being of a value whereby longitudinal signals of up to about a third harmonic of said resonant frequency are impeded, albeit to degrees lesser than the first mentioned longitudinal signals.

a resistance network including tip and ring feed resistors and tip and ring voltage taps being defined by tip and ring voltage dividers connected across the tip and ring feed resistors, the tip fed resistor being connected between the tip terminal and the output of the tip amplifier, in series with the tip winding, and the ring feed resistor being connected between the ring terminal and the output of the ring amplifier, in series with the ring winding; and an amplifier circuit having a transmit output and being responsive to differential signals across the tip and ring voltage taps and to AC signals at one of the inputs of the tip and ring amplifiers for providing AC signals from the communications line and destined for the telephone facility at the transmit output.

8. A method for coupling alternating current signals of a differential nature between a two wire communications line and a telecommunications facility comprising the steps of:

differentially driving signals destined for the two wire communications line, with a predetermined source impedance, via tip and ring amplifiers and tip and ring feed resistors;

differentially receiving, by means of a differential amplifier, signal voltages being developed by currents traversing the tip and ring feed resistors;

detecting signals destined for the telecommunications facility by subtracting a representation of the signals destined for the two wire communications from a representation of the differentially received signals; and notch filter in series with the tip and ring feed resistors to impede traverse of the tip and ring feed resistors by an longitudinal signals of about a predetermined frequency.

* * * * *